United States Patent Office 3,061,542
Patented Oct. 30, 1962

3,061,542
DRILLING AND COMPLETION FLUID
William A. Reddie and Eugene R. Werlein, Houston, Tex., assignors to Magnet Cove Barium Corporation, Houston, Tex., a corporation of Arkansas
No Drawing. Filed July 27, 1959, Ser. No. 829,548
23 Claims. (Cl. 252—8.5)

This invention relates to well drilling and completion fluid compositions of the flocculated clay type and to a method for reducing the fluid loss from such fluid compositions.

There has been recently developed an essentially water base drilling and completion fluid which finds particular use in wells having high bottom-hole temperatures. It also finds use in drilling through formations of highly hydratable material such as shale. In such a fluid, substantial hydration of clay solids is inhibited and they are maintained in a flocculated state. This is contrary to the theory of most drilling muds wherein the clay solids are purposely maintained in a dispersed state. In such a flocculated system, the conventional role of clays has been virtually eliminated and the conventional role of a dispersant, such as quebracho-caustic, has been completely eliminated. Thus, a surfactant is used, usually in conjunction with an electrolyte or salt (e.g. calcium sulfate) to maintain the clay solids in a flocculated condition, thereby giving the fluid an increased tolerance toward low-gravity solids. To control the fluid loss and sometimes to control rheological properties, a polyanion, such as sodium carboxymethylcellulose (hereinafter called CMC), is employed. This polyanion can also be used to give the fluid sufficient weight-suspending power that barite can be added to yield high-weight muds. As a further aid in controlling the fluid loss, small amounts of oil, usually less than 10%, are dispersed in the water phase and the emulsion is stabilized with an emulsifier. For a general discussion of this type (flocculated) well fluid, see, for example, The Oil and Gas Journal, September 10, 1956, pp. 104–107.

At this point, it should be pointed out that when "flocculated" clay solids or muds are referred to herein, it is meant that the clays in such muds are converted (or maintained) in the form of aggregates which are large enough not to act as true colloids to impart substantially increased viscosity to the muds. The viscosity-increasing characteristics of the clays are thereby minimized and they act more as inert solids. The surfactant flocculation permits of a higher solids content in the mud systems without undue increase in viscosity and also the surfactant-salt inhibits the dispersion of drilled clays or shales and tends to maintain the drilled solids as comparatively larger, unhydrated particles.

While such a flocculated fluid system has many advantages, such as those referred to above as well as its lack of a tendency to thicken at high temperatures, difficulty is encountered in controlling the fluid loss therefrom. Immediately after mixing and before heating, the fluid does have acceptably low fluid losses of the order of 2–4 ml. but upon heating to a temperature, say in excess of 250° F., the fluid loss rapidly increases to a prohibitive value. It is thought that this is at least in part due to the thermal decomposition of the CMC. This material is relatively expensive and large quantities are consumed where the bottom-hole temperature is 300° F. or above. Where a calcium salt, such as calcium sulfate or chloride, is used in the system, it has been considered that the heat stable fluid loss reducing agents, such as sodium polyacrylate (sold under the trademark "Cypan"), are incompatible. This conclusion has been based on the theory that the polyacrylate reacts with the calcium salt to form insoluble calcium polyacrylate.

It is accordingly an object of this invention to provide a drilling and completion fluid of the type wherein a surfactant is employed to maintain a clay in a flocculated state and which has heat-stable low fluid-loss characteristics imparted to it through the use of oil and an emulsifier having a unique capacity for fluid loss reduction in such a fluid.

Another object is to provide a method of reducing the fluid loss from such type of fluid in a manner such that the low fluid loss characteristics do not deteriorate with heating but, instead, frequently improve with heating.

Another object is to provide such a type of fluid which has rheological characteristics such that the use of heat-unstable fluid loss reducing agents is either not required or is in such small amounts that the cost there is not excessively high.

Another object is to provide a drilling and completion fluid in which clay can be maintained in a flocculated state with the aid of an alkaline earth metal salt and yet in which fluid loss control agents normally sensitive to such a salt can be effectively used.

It has now been found that when oil and a particular emulsifier are added to a flocculated clay type of well fluid, the fluid loss becomes markedly reduced and this effect frequently can be improved by heating. In fact, by using certain amounts of the emulsifier, the quantity of fluid loss reducing agent, such as CMC, which is usually required to maintain low fluid losses, is materially reduced and the need for it may be eliminated altogether. Further, the emulsifier has been noted to permit the use of such materials as sodium polyacrylate in systems containing alkaline earth metal salts as one of the flocculants. Apparently, the emulsifier in some way prevents the salts from reacting with the polyacrylate or the like so as to render the same completely ineffective. The particular emulsifiers used comprise oxyethylene adducts of certain polyphenolic bridge compounds such as 2,2' methylene bis (4,6-dinonylphenol), and bis-2-dinonylphenol sulfide.

Before turning to a detailed description of each of the components of the fluid of this invention, preferred compositions will be given. There are two different types of fluids. These may be termed a calcium type and a sodium type. Preferred formulae for these fluids may be as follows.

Calcium type:
  Bentonite, lb./bbl _____ 10
  Calcium sulfate, lb./bbl _____ 9
  Surfactant, lb./bbl _____ 8
  Diesel oil (by volume), percent _____ 10
  Emulsifier, lb./bbl _____ 5
  Weighting material as desired.

All concentrations are based upon one barrel of water.

Sodium type:
  Sodium chloride, lb./bbl _____ 3.5
  Surfactant, lb./bbl _____ 8
  Low yield clay, lb./bbl _____ 50
  Diesel oil (by volume), percent _____ 10
  Emulsifier, lb./bbl _____ 5
  Weighting material as desired.

All concentrations are based upon one barrel of water.

The surfactant preferably is a blend of 56% of phenol adducted with 30 mols of ethylene oxide, 4% of nonylphenol adducted with between 1 and 2 mols of ethylene oxide and 40% of water.

The emulsifier preferably is 2,2' methylene bis (4,6-dinonylphenol) adducted with 30 mols ethylene oxide per mol of the phenolic compound.

It will be understood that the above formulae are given as specific preferred ones and that the ingredients and concentrations thereof can be varied as will be discussed below.

EMULSIFIER

The principal role of the emulsifier is to provide a reduction in fluid loss from a flocculated clay system and to maintain fluid loss control despite continued heating of the system. In flocculated clay systems, fluid losses will ordinarily be relatively high due to the clay being flocculated and ordinary fluid loss control agents such as sodium carboxymethylcellulose (CMC) or the water-soluble polyacrylates, have disadvantages. Thus, the CMC degrades wtih heat so that it must be constantly added in order to maintain fluid loss control. The polyacrylates ordinarily do not yield as low fluid losses as CMC and frequently they too seem to lose their effectiveness with passage of time at elevated temperatures. The emulsifiers of this invention can be used either alone to control fluid loss or in conjunction with CMC, the polyacrylates or other fluid loss control agents. When used with CMC, the amount required of the latter is greatly reduced and so the constant addition thereof is at a lesser expense.

The emulsifiers can be represented by the following formula:

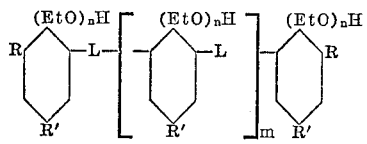

wherein L is selected from the group consisting of methylene, methylene substituted with one or two alkyl groups containing a total of not more than 4 carbon atoms, and monosulfur (—S—) groups; R is selected from the class consisting of hydrogen and alkyl groups (straight or branched chain) having from 6 to 12 carbon atoms per group; R' is an alkyl group (straight or branched chain) having from 6 to 12 carbon atoms per group; $n$ is an integer of from 6 to 25 (both inclusive); $m$ is an integer of from 0 to 4; and EtO is an ethylene oxide group.

Exemplary of compounds falling in the above class are the ethylene oxide adducts of 2,2'-methylene bis (4,6-dinonylphenol); bis-2-dinonylphenol sulfide; 2,2'-methylene bis (4-nonylphenol), 2,2'-methylene bis (4,6-dihexylphenol); 2,2'-methylene bis (4,6-dodecylphenol); 2,2'-methylene bis (4,6-dioctylphenol); bis (octyldecylphenol) methane; bis (hexylnonylphenol) methane; 2,2'-methylmethylene (hexyldodecylphenol) (dinonylphenol); 2,6-(2-methylene 4,6-dinonylphenol) 4-nonylphenol; 2,6-(2-methylmethylene 4-hexyl 6-dodecylphenol) 4-octylphenol; bis (2 - methylene (4 - octyl 6 - nonylphenol) 4 - hexylphenol) methane; 2,6 - (2 - methylene 4 - nonyl 6-methylene (4,6-dioctylphenol)) 4-hexylphenol; (2-methylene (6-(methylene 4,6-dinonylphenol)) 4-nonylphenol); (6-methylene (6-(methylene 4-octyl 6-dodecylphenol)) 4-octylphenol) methane; and other similar polymethylene phenolics as well as the corresponding sulfides (i.e. —S— groups are respectively substituted for one or more of the methylene groups).

The bridged compounds which are adducted with ethylene oxide to prepare the emulsifiers of this invention can be prepared in a number of different ways. For example, the desired alkylphenol or alkylphenols can be mixed together with a suitable bridging compound, such as an aldehyde, ketone, or sulfur chloride, together with a suitable catalyst, if desired, such as oxalic acid or sulfuric acid. The mixture can then be heated to a temperature in the range of 200 to 350° F. for a period of time sufficient to complete the reaction. Usually, the reaction will be completed within from one to eight hours depending upon the temperature employed. If desired, higher temperatures can be used with appropriately shorter reaction times. In some cases, it may be desired after initially preheating the material to a temperature between 200° and 300° F. for a period of time one to four hours, to then further raise the temperature to one within the range of 300° to 350° F. for a period of from one to four hours to assure complete resinification of the reactants.

Since phenols are known to have reactive hydrogens in the 2, 4 and 6 positions and since cross-linking of the resin molecules by bridging between the 4 positions of the phenol rings in different chains is to be avoided, the phenols used in the reaction should have a blocking alkyl group in the 4 position. Moreover, when 4-alkylphenols alone are used in the reaction, such as 4-nonylphenol, the mol ratio of the bridging compound to the phenol, such as the formaldehyde to phenol ratio, should be held well below 1:1, about 0.7 mol of the bridging compound to one mol of the phenol being the upper limit to prevent the resin from setting up and becoming insoluble and infusible. Thus, by a suitable limitation of the amount of the bridging compound employed, the average chain length of the bridged compound can be readily adjusted.

A more preferred way of regulating the average chain length of the bridged compound is to use a mixture of 4-alkyl and 4,6-dialkylphenols. The 4,6-dialkylphenols act as terminating groups and thus the amount of bridging compound present has no effect upon the average chain length. For example, when the average chain length is desired to comprise three phenolic rings, two mols of the dialkylphenol can be used per mol of the monoalkylphenol. When the average chain length is to average four phenolic rings per molecule, equimolar amounts of the dialkylphenol and monoalkylphenols can be used. When the average chain length is to comprise six phenolic rings, two mols of the monoalkyl should be used per mol of the dialkylphenol. Of course, when the bridged compound is to contain only two phenolic rings, it will be preferable to use only dialkylphenol in preparing the same. This procedure will automatically limit the bridging to be only between two phenolic rings and the product will be more uniform than when monoalkylphenol alone is used and the chain length is regulated by limiting the bridging compound.

Various mixtures of one or both of different monoalkyl and dialkylphenols can be employed to obtain various molecular configurations within the scope of the formula given above. For example, in addition to regulating the average molecular weight of the bridged compounds by regulating the mol ratio of the mono to the dialkylphenols, or by using only monoalkylphenols and regulating the amount of bridging compound employed, the average molecular weight can further be controlled by employing phenols having alkyl groups of various chain lengths selected to give the desired average molecular weight. For example, use of dodecyl substituted phenols will yield a higher molecular weight product than will the use of hexyl substituted phenols and by selecting alkyl substituted phenols between these two limits, a wide range of molecular weights can be achieved.

For further discussion pertinent to the bridged compounds described above and the methods of preparing the same, reference is made to "The Chemistry of Phenolic Resins," by Robert W. Martin, John Wiley & Sons, 1956.

The mono and dialkylphenols employed to form the bridged compounds used in this invention can be prepared by various known processes such as by reacting phenol with an olefin hydrocarbon of the desired chain length and configuration in the presence of a catalyst such as sulfuric acid or boron trifluoride. The olefin can be derived from hydrocarbon sources such as by dehydrogenating the corresponding aliphatic hydrocarbon or polymerizing a short chain olefin to the desired chain length. They also can be derived by decarboxylating the corresponding fatty acid.

As indicated above, the bridging compound can be selected from the class consisting of aldehydes, ketones and sulfur chloride. The aldehyde should contain from one carbon atom to four carbon atoms per molecule and thus can range from formaldehyde to butyraldehyde. Any methyl ketone containing up to four carbon atoms (methylethylketone) can be used. When the bridged compound is to be formed as a sulfide, sulfurmonochloride, together with elemental sulfur, if desired, can be used and here again the same proportions of this bridging compound should be employed as discussed above with respect to the aldehydes and ketones. Of course, a mixture of the methylene type and the sulfur type bridging compounds can be employed if desired, although this is usually not desirable.

The emulsifier can be prepared from a still bottoms derived from a phenol alkylation process. In such a process, phenol is alkylated with alkylene of desired chain length and configuration to yield predominantly the corresponding alkylphenol and dialkylphenol. There also occurs a residue comprising compounds of higher boiling point than that of the dialkylphenol. The exact composition of this residue is not known but it is known that it is a product of the aforementioned phenol alkylation process. In any event, the alkylate comprising alkylphenol, dialkylphenol and residue is fractionated to recover an overhead product or products. The first principal cut to be recovered will be the alkylphenol although this may be preceded by small amounts of unreacted alkylene or phenol or both. If the fractionation is stopped at this point, as it frequently is in commercial practice, the remaining bottoms product will comprise the residue, dialkylphenol and any alkylphenol which did not pass out as overhead. Of course, the relative proportions of these three components will vary with the efficiency of the alkylation process and of the fractionation step.

A preferred emulsifier can be produced from still bottoms derived from a process for producing nonylphenol. The nonylphenol still bottoms, which is a commercially available product, is presently derived as a by-product in the preparation of nonylphenol. In such preparation, one common practice is to polymerize propylene to provide a nonene comprising a very high percentage of nine carbon chain trimer. Other nonenes can be used. The nonene is then reacted with phenol in the presence of a catalyst, such as sulfuric acid or boron trifluoride. There results a mixture of alkylated phenols which is distilled to produce an overhead product comprising relatively pure nonylphenol. The still bottoms from this fractionation comprises a portion of the nonylphenol not distilled over as overhead plus dinonylphenol and the higher boiling residue which may contain polymerized phenols, alkylates of phenols which are higher boiling than dinonylphenol, complex benzene compounds, and the like. The residue has a boiling point higher than dinonylphenol.

It will be apparent that the amount of dinonylphenol in the still bottoms will vary with the efficiency of the alkylation process and of the subsequent fractionation step. By suitable fractionation procedure, the nonylphenol can be completely removed, leaving the still bottoms comprising dinonylphenols and residue. With still further fractionation, a part or all of the dinonylphenols can be removed leaving a still bottoms comprising a purified or a substantially pure residue. Such fractionation usually is conducted under a vacuum of say 10 to 20 mm. Hg pressure and at a fractionator head temperature of at least 200° C., such temperature being determined by the boiling point of the fraction desirably removed overhead. The still bottoms, comprising the residue and dinonylphenol and the nonylphenol, if any, is condensed to secure the bridged compound.

An excellent emulsifier can be prepared by the following method of synthesis of a methylene bridged compound from nonylphenol still bottoms. The emulsifiers of Example 3 were prepared by this method.

Two thousand parts by weight of nonylphenol residue were placed in a reaction vessel equipped with an agitator. The residue was heated with continuous fast stirring until the temperature was raised to 110° C. Forty parts by weight of oxalic acid (hydrate) were then added with continuous stirring and the temperature was maintained at 110° C. until the steam from the dehydration of oxalic acid had subsided. Then the temperature was raised to 130° C. Two hundred forty parts by weight of paraformaldehyde were added with continuous stirring over a period of one and one-half hours. After its addition, the temperature was maintained in the range of 130° to 135° C., with continuous stirring for two additional hours. The temperature was then raised to 160° C. with continuous stirring and both were maintained for three hours to complete the resinification. The polymethylene-type resin product of this synthesis was adducted with oxyethylene in the usual manner to form the emulsifier.

The alkylate from the alkylphenol process should be fractionated until at least 50% of the monoalkylphenol produced from the process is removed as an overhead leaving the remainder as still bottoms. Stated numerically, the still bottoms can comprise the residue mixed, for each part of weight of residue, with from 1 to 20 parts of dialkylphenol, and with 1 to 10 parts of monoalkylphenol, the residue in any case being present in an amount of at least 5 weight percent of the total still bottoms. By regulation the extent of the fractionation, the ratio of mono to dialkylphenol can be controlled to regulate the bridged compound's average chain length as described above. Also, additional amounts of either or both dialkylphenol or monoalkylphenol can be mixed with the still bottoms to obtain the desired mono to dialkylphenol ratio.

One specific still bottoms contains 20 percent nonylphenol, 50 percent dinonylphenol and 20 percent residue and many will contain from about 15 percent to about 30 percent nonylphenol with the balance being dinonylphenol and residue, the dinonylphenol comprising the major portion of the balance with the residue varying from at least 5 percent to as high as 20 percent or more.

The desired bridged compound or compounds are reacted with oxyethylene to form an adduct. This adducting reaction is well known to those skilled in the art. The amount of oxyethylene to be reacted should be sufficient to give the bridged compound a limited solubility in water. An amount chosen from the range of 6 to 20 mols of oxyethylene per mol of phenol in the bridged compound can be employed. It has been noted that the emulsifiers prepared with an amount of oxyethylene from the lowest part of the above range results in muds having superior fluid loss properties and usually these smaller amounts will be preferred.

The amount of the emulsifier employed should be in the range of 0.2 to 10 lb./bbl. of well fluid and preferably at least 0.2 lb. for each percent of oil employed. It has been found that while amounts of emulsifier below 1 lb./bbl., and at least this amount is preferred, give some fluid loss reduction, amounts in excess of 1 lb./bbl. are more appropriate since relatively lower fluid loss values are obtained. Amounts in excess of 10 lb./bbl. are usually uneconomical but are not harmful to the mud. It has also been found that after the emulsifier has been added to the system, the desired fluid loss reduction is frequently achieved only after the emulsifier has been permitted to react with the system for a period of time. Such reaction is greatly accelerated by heating the system to an elevated temperature, say in excess of 250° but below 550° F.

WATER PHASE

Since the water phase serves as a solvent or supporting medium for the other components of the well fluid, the amount used will depend primarily upon the total volume of fluid to be compounded. It is possible to increase the water so as to water down the fluid and thereby decrease its viscosity and gel strength to some extent. The type of water can vary within wide limits, including fresh water, salt water, sea water, and, in general, any type of water having a pH less than 10. Further, the water phase can be derived from an ordinary water-base drilling mud provided that the pH of the mud is decreased to be less than 10 and, preferably, that any dispersant therein, such as quebracho, be permitted to decrease to a minimum value before the water-base mud is converted to the mud of this invention. In essence, then, the use of caustic and dispersants in the mud of this invention is to be avoided.

CLAY

When the well fluid is first compounded, a minimum amount of clay should be used—just enough to yield the desired viscosity and gel characteristics taking into consideration the effect of the other ingredients on these characteristics. As drilling proceeds, the light solids will increase and hence the viscosity will likewise increase although not nearly so much as it would increase if the solids were dispersed as in conventional systems. The drilled solids can be removed to control the viscosity. Thus, the amount of clay can vary within wide limits depending upon the desired viscosity limits. Usually, from 5 to 15 pounds per barrel of a hydratable clay such as bentonite will be satisfactory to initially compound the fluid. Other amounts of other clays can be used depending on the viscosity such clays impart to the fluid.

SURFACTANT

The primary role of this ingredient is to impart a desired flocculating effect on the clay with a minimum of foaming. It controls the rheological properties of the well fluid by strongly adsorbing on the clay surfaces and interstices. As the surfactant flocculates the clay, there results a reduced plastic viscosity, yield point and gel strength. This, of course, increases the tolerance of the fluid for light-weight solids such as drilled clay particles. The surfactant also inhibits the dispersing and swelling tendency of clays, such as hydratable shales, entering a mud system. As a result, massive hydratable shale formations can be easily drilled.

The class of surfactants useful for this purpose include both the nonionic and the ionic types. They are water-soluble organic compounds which are heat stable, i.e. stable to a temperature of at least 250° F. While all surfactants have some flocculating effect on clays, some are more efficient than others. It will therefore be understood that while this invention is applicable to all flocculated clay mud systems to reduce the fluid loss therefrom, it finds its most effective use in such systems flocculated by the more efficient flocculating surfactants. One reason for this is that the more efficient the flocculating action, the greater will be the fluid loss in the absence of a fluid loss control agent. Therefore, the oil-emulsifier combination of this invention will have its most marked effect in these highly flocculated systems.

There are a number of flocculated clay mud systems known to the art. One preferred one uses a flocculating surfactant which can be generally described as phenolic materials which have been water-solubilized by reacting with a water-solubilizing radical to form an adduct. Exemplary of this type of surfactant and a preferred species is phenol which has been adducted with about 30 mols of ethylene oxide per mol of phenol. The ethylene oxide chain imparts sufficient water-solubility to the phenol that the adduct is adsorbed on the surface of and in the interstices of the clay particles to flocculate the same. The amount of ethylene oxide adducted with the phenol can vary within limits, say from 20 to 50 mols per mol of phenol, but in any event it should be sufficient to render the phenol sufficiently water-soluble that it can be adsorbed on the clay particles. Adducts of phenolics other than phenol can also be used. Thus, alkylphenols wherein the alkyl group or groups have a total of from 1 to 10 carbon atoms (total for all groups) can be adducted with an oxyethylene, oxypropylene or mixtures thereof to act as the flocculating surfactant. Among such phenolic materials can be mentioned the various monoalkylphenols ranging from methyl through decylphenol, including the branch chain isomers thereof, such as isohexylphenol. As a matter of fact, the alkyl groups having a carbon atom content in the upper part of the above range will usually be of the branched type. For example, one usable commercially available nonylphenol can be described as 3,4,5 methylhexyphenol. Whether or not the alkyl group is straight or branched chain does not seem to affect this invention. The selected number of carbon atoms need not all be disposed in a single alkyl group but can be in two or more so long as the total for all groups is in the above range. For example, dimethyl-, methylethyl-, ethylhexyl-, propylpentyl-, methyloctyl-, and other similar combinations or alkyl groups can be employed.

The alkyl or polyalkylphenol should, like the phenol, be adducted with sufficient oxyethylene to render it water-soluble. An amount of oxyethylene within the range of 20 to 50 mols is usually sufficient, with amounts in the upper part of the range being used where the total number of carbon atoms in the alkyl group or groups are in the upper part of their range. For example, less oxyethylene is required to solubilize methylphenol than to solubilize nonylphenol. The exact amount of oxyethylene to be used in any particular case can be readily determined by a mere routine test. The ethylene oxide (oxyethylene) can in some cases be supplemented with or substituted by oxypropylene to give the desired solubility and molecular weight characteristics.

The mode of alkylating phenols to provide the above class of phenolic compounds is well known to those skilled in the art. Likewise, the adduction of these phenols with oxyethylene is also known. Many of the adducts are commercially available on the open market. Accordingly, further description of the mode of making these surfactants is not required. Further, other clay flocculating surfactants, both nonionic and ionic, can be used and the suitability of any particular surfactant for use in any particular system can be determined by mere routine test.

For example, salts of alkylene polyamines and of certain other organic nitrogen bases are excellent flocculating agents. Exemplary of such salts are those found by reacting acetic, hydrochloric, sulfuric, oxalic, adipic acids with ethylene diamine, diethylene triamine, triethylene tetramine, propylene diamine, tetrabutylene pentamine, dipropylene triamine, aniline, pyridine, long chain fatty acid amines, and the like. Generally, the amine portion of these salts, when formed from the alkylene polyamine, can be said to comprise, per molecule, from 2 to 6 amino nitrogen atoms and from 1 to 5 alkylene groups having from 2 to 4 carbon atoms per group, the number of alkylene groups in any one instance being one less than the number of amino nitrogens. The extent of neutralization of the various amines or bases to form the salt can vary from 75 to 100 percent and preferably is about at least 90 percent. In this respect, an amine and an acid can be added as such to the mud to react in situ to form the salt of the amine. In many cases, it will be desirable to also add a polyanionic fluid loss reducing agent, such as CMC or a polyacrylate, to aid in the control of rheological properties.

Since this invention is useful in all flocculated clay solids or mud systems, the term "clay flocculating surfactant" will be used herein as applicable to any surfactant capable of converting (or maintaining) a hydratable clay in a flocculated state in a water phase to yield a "flocculated clay solid or mud" system as above defined.

The amount of surfactant to be used should be sufficient to flocculate the clay. As a practical matter, it is desired that an excess of surfactant be employed so that free surfactant is present in the water phase. This makes available a "reservoir" of surfactant for adsorption on new clay particles entering the mud system. Generally, the amount of surfactant to be used can be stated to be in the range of 1 to 15 pounds per barrel of fluid, depending upon the concentration of clay solids which are to be flocculated by the surfactant and upon the desired excess, i.e. free (unadsorbed) surfactant, if any. Preferably, 0.5 to 2.5 pounds per barrel of excess (free) surfactant is maintained.

SALTS

In some systems, water-soluble metal salts are preferably employed in conjunction with the surfactant to aid it in flocculating the clay although their use is optional unless the maximum flocculating action is desired or unless optimum rheological properties are required. Salt finds its most effective use with the phenol adduct type of flocculating surfactant but is also effective with the amine salt and other types. For the phenol type, the surfactant in itself will induce flocculation but it will be aided in this respect to a degree by the addition of a salt. Salt in general, in the absence of this type of surfactant, reduces plastic viscosity but increases the yield point and gel strength. When used with this surfactant, the viscosity, yield point and gel strength are all markedly reduced even more than with the surfactant alone. Generally, any common electrolyte or water-soluble metal salt which can flocculate the clay can be used, including the alkali metal and alkaline earth metal salts such as sodium chloride, potassium chloride, calcium chloride, barium chloride, calcium sulfate, etc. The selected salt should have a solubility of at least 1,000 p.p.m. so that enough ions will be present to effectively aid the surfactant in flocculating the clay.

The amount of salt to be used can vary over a reasonably broad range and should be sufficient so that in conjunction with the surfactant, the desired degree of flocculation of the clay is obtained. Generally, an amount within the range of 0.3 (approximately 1000 parts per million) to 15 pounds per barrel can be used (based upon a 350 pound barrel). Where the salt is an alkali metal salt, such as sodium chloride, it is preferred to choose an amount from the lower portion of such range, as for example, from the more limited range of 0.3 to 7 pounds per barrel and still more preferably from the range of 0.3 to 3 pounds per barrel. It has been found that as the sodium chloride concentration increases, the effectiveness of the emulsifier of this invention decreases somewhat. Therefore, best results are obtained in the so-called "low sodium" systems.

When an alkaline earth metal salt is to be used, calcium sulfate is preferred. One reason is that calcium salts will convert clays such as bentonite to the calcium form which is usually less hydratable than is the sodium form. Another reason is that calcium sulfate has a limited solubility in water so that an excess of undissolved calcium sulfate can be maintained as a reservoir for treatment of clays entering the system without greatly increasing the amount actually in solution. This is particularly important where the resistivity of the mud is to be maintained for electric logging. In ordinary practice, from 1 to 15 pounds per barrel of calcium sulfate is preferably used. However, as indicated above, the amount of salt can vary over a wide range without departing from the spirit of this invention.

The invention finds particular applicability to surfactant muds made from sea water. The latter includes a mixture of various salts including about 3.5 percent sodium chloride and approximately 1000 parts per million of calcium. Further, brackish waters can be used. Also, ordinary water base muds will often contain salt, e.g. 1000 to 10,000 p.p.m. or more, so that they can be converted, even when the use of salt is desired, without further addition of salt. Accordingly, the source of the salt is unimportant.

As indicated above, the emulsifier of this invention tends to maintain the fluid loss reducing efficiency of polyacrylates and of other calcium sensitive fluid loss reducing agents in the presence of calcium or other alkaline earth metal ions. Thus, the emulsifier permits the use of such agents in both alkaline earth metal surfactant muds and in alkali metal surfactant muds. However, where a minimum fluid loss is desired, it is advisable to use the so-called low sodium surfactant mud. In such, the alkali metal salt concentration is maintained within the range of 2000 to 20,000 parts per million, soluble alkaline earth metal ions at a minimum (e.g. below 300 parts per million of alkaline earth metal ions in the aqueous phase) so that a polyacrylate fluid loss reducing agent can be used with a minimum of interference from the alkaline earth metal ions. The alkaline earth metal ions can be maintained at such minimum by suitable treatment with a precipitating agent, as for example, calcium can be precipitated by sodium carbonate, etc. Of course, where such procedure is used, the amount of precipitating agent used can be determined by routine tests on the mud to find the quantity required to precipitate any excess quantity of alkaline earth metal ions in the mud.

OIL PHASE

The oil to be used can comprise any mineral oil conventionally used in forming oil-base or emulsion drilling muds. For example, diesel oil, crude oil, gas oil, kerosene, and others are usable. The amount to be used should be at least 1% and preferably within the range of 1%–20% by volume. As a practical matter, at least 5% will usually be used, and it has been found that oil concentrations in the range of 10%–15% produce maximum results. As will be seen below, there are indications that minimum fluid losses are obtained in some muds with about 15% by volume of oil, but this will vary with different muds. Since the viscosity of the mud increases with increasing oil concentrations, amounts greater than 20 volume percent are not ordinarily preferred.

OTHER FLUID LOSS REDUCING AGENTS

In some cases, such as to achieve an unusually low fluid loss with a minimum amount of emulsifier, or to impart increased weight-suspending ability to the well fluid, or to otherwise improve the rheological properties of the fluid, CMC, polyacrylate or other fluid loss reducing agents can be employed. The amount should be to achieve the desired effect and will usually be from 1 to 10 pounds per barrel. Of course, continuous addition of CMC will be required where high temperatures are encountered since CMC decomposes or loses its effectiveness over a period of time at high temperatures. This is not always true of Cypan.

FOAM SUPPRESSORS

The surfactants described above, being highly water-soluble, may cause foaming of the fluids. To suppress this, a foam suppressor can be added. Generally, these can be the same type of compounds as the surfactants except that their water solubility is reduced such as by making the oxyethylene chain much shorter. Hence, these suppressors can be said to be oil-soluble. An example thereof is nonylphenol adducted with one mol of ethylene oxide. A preferred surfactant mix comprises about 56 percent phenol adducted with 30 mols of ethylene oxide, 4 percent nonylphenol adducted with 1 mol ethylene oxide and 40 percent of water. These proportions can be varied as desired.

PROCEDURE OF COMPOUNDING AND USING

In making up the fluid of this invention, it is usually preferred that the clay solids in a system be prehydrated, i.e., permitted to hydrate before any of the salts, surfactant, oil or emulsifier are added. New mud can be prepared by dispersing the clay in the water and then agitating for several hours, say 1 to 4. Also existing fresh water mud can be employed provided that the caustic and dispersant content has been permitted to be depleted or the mud is watered back to reduce the concentration thereof. In any event, the hydrated clay-water mixture has the selected salt, if any, added thereto, such as calcium sulfate, and this is permitted to react with clay. Then the surfactant is added. Then, preferably, a conventional fluid loss reducing agent, such as CMC or Cypan, can be added, not only to control the fluid loss if the fluid is being circulated through the well but also to impart weight-suspending ability to the fluid. This addition can be followed by barite or other weighting agents to give the desired weight, followed by the oil and the emulsifier. It is preferred that the oil and emulsifier be mixed together and then the mixture added to the previously mixed ingredients. Bringing the emulsifier in with the oil gives lower fluid losses and a superior mud contrasted to bringing in the oil and emulsifier separately. After the emulsifier has been added, the mud is preferably heated as aforesaid, either by artificial means or by circulating through a well having a sufficiently high bottom-hole temperature, e.g. in excess of 250° F.

When the polyamine salt type of surfactant is employed, it is preferable to add it to the base mud and then add a polyanionic fluid loss control agent to improve rheological properties. Salt need not be added.

While the above is a preferred mode of compounding the well fluid, it is not necessarily the only one and is given merely for illustrative purposes.

In using the mud, salt, if any, and surfactant are added as needed preferably to maintain a free excess thereof available for reaction with clay solids entering the system. These clay solids are removed as required to control viscosity at a reasonably low value. Centrifugation can be used for this purpose. Additional emulsifier can also be added to maintain a desirably low fluid loss and certainly should be added if free oil appears in the mud pits. Caustic and dispersants should not be used.

ILLUSTRATIVE DATA

Two types of flocculated clay muds were employed throughout the tests, one being the calcium type and the other the sodium type. Their composition is as follows for Examples 1, 3 and 4:

|  | Type | |
| --- | --- | --- |
|  | Calcium | Sodium |
| Water, bbl | 0.54 | 0.54 |
| Bentonite, lb./bbl | 6 | 6 |
| Gypsum, lb./bbl | 5 | |
| NaCl, lb./bbl | | 3.5 |
| Surfactant,¹ lb./bbl | 5 | 5 |
| Barite, lb./bbl | 490 | 490 |
| Diesel oil, percent by vol | 10 | 10 |
| Emulsifier, lb./bbl | 5 | 5 |

¹ The preferred surfactant identified immediately below the preferred formulas given in column 2.

In each case, the clay or bentonite was mixed for three hours with the specified water. The salt was then added to the pre-hydrated bentonite and stirred for an additional three hours. The surfactant was then added and stirred for 10 minutes followed by the barite, oil and emulsifier in that order.

The emulsifiers employed are identified as follows:

| Abbreviation in tables | Name of dialkylphenol | Moles of oxyethylene adducted with dialkylphenol |
| --- | --- | --- |
| M+19.6 | 2, 2'-methylene bis (4,6-dinonylphenol) | 19.6 |
| M+29.4 | ---do--- | 29.4 |
| M+43.5 | ---do--- | 43.5 |
| M+62.7 | ---do--- | 62.7 |
| S+46 | Bis 2-dinonylphenol sulfide | 46.0 |

EXAMPLE 1

The emulsifiers indicated in Table I were added to samples of each type of mud, the initial (without heating) properties taken on some samples and other samples were heated, with rotation, for 72 hours at 350° F. and for one week at 350° F.

Table I

CALCIUM TYPE

| Emulsifier | Properties—Initial | | | Properties 72 hrs. at 350° F. | | | Properties—1 wk. at 350°F. | | |
| --- | --- | --- | --- | --- | --- | --- | --- | --- | --- |
|  | F.L. 90 | Visc. cps. | Gels 0/10 | F.L. 90 | Visc. cps. | Gels 0/10 | F.L. 90 | Visc. cps. | Gels 0/10 |
| None | 79 | 57 | 45/45 | 74 | 47 | 33/57 | 100 | 50 | 12/22 |
| M+29.4 | 1.5 | 39 | 16/17 | 3 | 26 | 5/9 | 1 | 29 | 4/11 |
| M+43.5 | 23 | 35 | 12/17 | 23 | 26 | 3/5 | 20 | 26 | 2/7 |
| S+46.0 | 29 | 35 | 17/21 | 33 | 31 | 7/12 | 30 | 32 | 6/11 |

SODIUM TYPE

| Emulsifier | Properties—Initial | | | Properties 72 hrs. at 350° F. | | | Properties—1 wk. at 350°F. | | |
| --- | --- | --- | --- | --- | --- | --- | --- | --- | --- |
|  | F.L. 90 | Visc. cps. | Gels 0/10 | F.L. 90 | Visc. cps. | Gels 0/10 | F.L. 90 | Visc. cps. | Gels 0/10 |
| None | 60 | 50 | 40/65 | 70 | 40 | 4/35 | 94 | 35 | 8/18 |
| M+29.4 | 5 | 39 | 15/18 | 5 | 22 | 2/5 | 2 | 21 | 3/5 |
| M+43.5 | 15 | 34 | 11/16 | 32 | 25 | 2/6 | 22 | 23 | 2/5 |
| S+46.0 | 19 | 34 | 13/18 | 23 | 25 | 3/11 | 27 | 24 | 3/12 |

From the above, the marked reduction in fluid loss by the use of the emulsifier will be noted. Also, it will be seen that the use of lesser amounts of ethylene oxide gives improved results.

EXAMPLE 2

To demonstrate the effect of varying the amount of ethylene oxide adducted with 2,2' methylene bis (4,6 dinonylphenol), the emulsifiers indicated in Table II were added to sodium type mud samples and properties determined and which were then heated, with agitation for 72 hours at 350° F. and for one week at 350° F. For these tests the following sodium fluid samples were used.

Sodium type:
- Water, bbl _____ 1
- Sodium chloride, lb./bbl _____ 3.5
- Clay mix, lb./bbl. [44 pts. by wgt. low yield calcium montmorillonite, 13 pts. bentonite, 18 pts. Macco P-95 (a low yield clay) and 25 pts. silica flour] _____ 15
- Surfactant, lb./bbl _____ 8
- Barite, lb./bbl _____ ¹ 788
- Diesel oil (volume), percent _____ 10
- Emulsifier, lb./bbl _____ 5

¹ For a final fluid weight of 17 lb./gal.

Table II

SODIUM TYPE

| Emulsifier | Properties—Initial | | | Properties 72 hrs. at 350°F. | | | Properties—1 wk. at 350°F. | | |
| --- | --- | --- | --- | --- | --- | --- | --- | --- | --- |
|  | F.L. 90 | Visc. cps. | Gels 0/10 | F.L. 90 | Visc. cps. | Gels 0/10 | F.L. 90 | Visc. cps. | Gels 0/10 |
| M+19.6 | 9.4 | 31 | 10/14 | 16.6 | 23 | 4/8 | 13 | 24 | 2/8 |
| M+62.7 | 16.8 | 30 | 6/12 | 71.5 | 28 | 4/9 | 76 | 28 | 3/9 |

By comparing Table II with Table I, the 2,2' methylene bis (4,6 dinoyphenol) gives the best fluid loss reducing properties when adducted with approximately 30 moles of ethylene oxide. When approximately 63 moles of ethylene oxide were used, inferior results were obtained. Thus, it appears the amount of ethylene oxide should be approximately 30 moles for the best results although other amounts can be used and still achieve the improved results of this invention.

EXAMPLE 3

The preceding data shows the use of substantially pure 2,2' methylene bis (4,6 dinonylphenol) adducted with ethylene oxide to prepare the emulsifier.

The data of Table III shows the fluid loss control achieved by an ethylene oxide adduct of a methylene bridged material produced from nonylphenol still bottoms as described on page 12. The methylene bridged material was adducted with ethylene oxide as follows.

| Emulsifier | Methylene bridged | Ethylene oxide |
|---|---|---|
| R+1 | 1 part by weight of resin | 1 part by weight ethylene oxide. |
| R+2 | do | 2 parts. |
| R+3 | do | 3 parts. |

The above emulsifiers were added to the fluid system of Example 1.

*Table III*

CALCIUM TYPE FLUID SYSTEM

| Emulsifier | Initial properties | | | Properties after heating 3 days at 350° F. rotating | | |
|---|---|---|---|---|---|---|
| | F.L. 90 | Visc. cps. | Gels 0/10 | F.L. 90 | Visc. cps. | Gels 0/10 |
| None | 73 | 51 | 22/22 | 90 | 47 | 22/40 |
| R+1 | 20 | 48 | 24/20 | 34 | 33 | 17/19 |
| R+2 (average of three readings) | 7 | 36 | 15/18 | 22 | 30 | 9/11 |
| R+3 | 19 | 32 | 12/16 | 14 | 25 | 3/9 |

SODIUM TYPE FLUID SYSTEM

| | F.L. 90 | Visc. cps. | Gels 0/10 | F.L. 90 | Visc. cps. | Gels 0/10 |
|---|---|---|---|---|---|---|
| None | 75 | 51 | 26/30 | 87 | 39 | 13/26 |
| R+1 | 21 | 47 | 20/16 | 21 | 33 | 9/22 |
| R+2 (average of two readings) | 5 | 36 | 14/18 | 7 | 25 | 3/11 |
| R+3 | 19 | 33 | 12/14 | 23 | 27 | 4/10 |

It should be noted that all the foregoing tests were conducted without adding any conventional fluid loss reducing agent such as CMC or polyacrylate, to the muds. Also both the calcium and the sodium type mud, without emulsifiers, have fluid losses approaching 100%. This was particularly true after heating.

EXAMPLE 4

The effect of varying oil concentrations is shown in Table IV. The fluid system used was the same as in Example 3 and had added to it the preferred emulsifier R+2. The fluid system was heated at 350° F. for the time indicated (with constant agitation).

*Table IV*

CALCIUM TYPE

| Percent diesel oil | Initial properties | | | Properties heated 3 days at 350° F. | | |
|---|---|---|---|---|---|---|
| | F.L. 90 | Visc. cps. | Gels 0/10 | F.L. 90 | Visc. cps. | Gels 0/10 |
| 0 | 64 | 42 | 33/35 | 21 | 41 | 7/18 |
| 10 | 5.2 | 36 | 14/17 | 6.8 | 28 | 4/10 |

Note that there was fluid loss control even in the absence of oil since a blank (no emulsifier) could have a fluid loss approaching 100% when so heated.

As indicated above, the emusifiers of this invention tend to maintain the effectiveness of polyacrylate fluid loss control agents in the presence of calcium. The test results of Table V clearly show that the emulsifier maintains the fluid loss control even though calcium ions are present in the system in sufficient quantity to react with the Cypan to form insoluble calcium polyacrylates. For these tests the following mud system was employed:

| | |
|---|---|
| Water, bbl | 0.54 |
| Bentonite, lb./bbl | 6 |
| Calcium sulfate, lb./bbl | 5 |
| Surfactant, lb./bbl | 5 |
| Cypan, lb./bbl | 3 |
| Diesel oil, percent | 10 |
| Emulsifier, lb./bbl | 5 |

These concentrations are based on final mud volume and weight. The mud was again weighted to 17 lb. per gallon with barite and the surfactant was the same as that used in the other tests reported above.

*Table V*

| Heating | Emulsifier | Visc. cps. | Gels 0/10 | F.L. 90 | Ca++ in filtrate p.p.m. |
|---|---|---|---|---|---|
| None | None | 95 | 1/2 | 8.5 | 1,240 |
| | R+2 | 102 | 4/8 | 1.7 | 1,080 |
| 350° F. for 72 hrs | None | 52 | 0/0 | 24 | 440 |
| | R+2 | 62 | 0/7 | 4.2 | 400 |
| 350° F. for 1 wk | None | 61 | 0/0 | 30 | 600 |
| | R+2 | 65 | 0/6 | 4.0 | 400 |

It will thus be seen that Cypan, in the absence of the emulsifier, loses its effectiveness with heating, probably due to the formation of insoluble polyacrylates. However, for some reason, the emulsifier maintains a low fluid loss even over an extended period of heating.

From the foregoing it will be seen that this invention is one well adapted to attain all of the ends and objects hereinabove set forth, together with other advantages which are obvious and which are inherent to the method and composition.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

The invention having been described, what is claimed is:

1. A fluid useful in drilling and completing wells which comprises in combination, a mixture in water of clay solids, from 1 to 15 pounds per barrel of a "clay flocculating surfactant" maintaining the clay solids in a flocculated state to provide a "flocculated clay solids system," from 1 to 20 volume percent of mineral oil, from 0.3 to 15 pounds per barrel of water-soluble salt selected from the group consisting of alkali metal salts and alkaline earth metal salts, and from 0.2 to 10 pounds per barrel of a compound having the structural formula

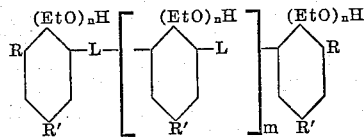

wherein L is selected from the group consisting of methylene, methylene substituted with not more than two alkyl groups containing a total of not more than 4 carbon atoms, and monosulfur (—S—) groups; R is selected from the group consisting of hydrogen and straight and branched chain alkyl groups having from 6 to 12 carbon atoms per group; R' is selected from the group consisting of straight and branched chain alkyl groups having from 6 to 12 carbon atoms per group; $n$ is an integer in the range from 6 to 25, inclusive; $m$ is an integer in the range of from 0 to 4, inclusive; and EtO is an ethylene oxide group.

2. The fluid of claim 1 wherein the compound having the structural formula given therein is 2,2'-methylene bis (4,6-dinonylphenol) adducted with 12 to 50 mols of oxyethylene.

3. The fluid of claim 1 wherein said compound having the structural formula given therein is bis (2-dinonylphenol) sulfide adducted with 12 to 50 mols of oxyethylene.

4. The fluid of claim 1 having also 1 to 10 pounds per barrel of a water-soluble polyacrylate fluid loss reducing agent.

5. A fluid useful in drilling and completing wells which comprises in combination, a mixture in water of clay solids, 5 pounds per barrel of a "clay flocculating surfactant" maintaining the clay solids in a flocculated state to provide a "flocculated clay solids system," 10 volume percent of mineral oil, 3½ pounds per barrel of sodium chloride, and 5 pounds per barrel of an emulsifier consisting essentially of 2,2'-methylene bis (4,6-dinonylphenol) adducted with about 30 mols of oxyethylene per mol of said 2,2'-methylene bis (4,6-dinonylphenol).

6. A fluid useful in drilling and completing wells which comprises in combination, a mixture in water of clay solids, 5 pounds per barrel of a "clay flocculating surfactant" maintaining the clay solids in a flocculated state to provide a "flocculated clay solids system," 10 volume percent of mineral oil, 5 pounds per barrel of calcium sulfate, 5 pounds of an emulsifier consisting essentially of 2,2'-methylene bis (4,6-dinonylphenol) adducted with about 30 mols of oxyethylene per mol of said 2,2'-methylene bis (4,6-dinonylphenol).

7. A fluid useful in drilling and completing wells which comprises in combination, a mixture in water of clay solids, 5 pounds per barrel of a "clay flocculating surfactant" maintaining the clay solids in a flocculated state to provide a "flocculated clay solids system," 10 volume percent of mineral oil, 3½ pounds per barrel of sodium chloride, and 5 pounds per barrel of an emulsifier consisting essentially of bis (2-dinonylphenol) sulfide adducted with about 30 mols of oxyethylene per mol of said bis (2-dinonylphenol) sulfide.

8. A fluid useful in drilling and completing wells which comprises in combination, a mixture in water of clay solids, 5 pounds per barrel of a "clay flocculating surfactant" maintaining the clay solids in a flocculated state to provide a "flocculated clay solids system," 10 volume percent of mineral oil, 5 pounds per barrel of calcium sulfate, and 5 pounds per barrel of an emulsifier consisting essentially of bis (2-dinonylphenol) sulfide adducted with about 30 mols of oxyethylene per mol of said bis (2-dinonylphenol) sulfide.

9. A fluid useful in drilling and completing wells which comprises in combination, a mixture in water of clay solids, from 1 to 15 pounds per barrel of a "clay flocculating surfactant" maintaining the clay solids in a flocculated state to provide a "flocculated clay solids system," from 1 to 20 volume percent of mineral oil, from 0.3 to 15 pounds per barrel of water-soluble salt selected from the group consisting of alkali metal salts and alkaline earth metal salts, and from 0.2 to 10 pounds per barrel of an emulsifier consisting essentially of an oxyethylene adduct of a polymethylene resin, said resin being the product of the reaction of alkylphenol still bottoms with a bridging compound selected from the group consisting of aliphatic aldehydes and ketones having not more than 4 carbon atoms per molecule and sulfur monochloride, the number of phenol rings in a molecule of said resin averaging from 2 to 6 and the alkyl groups attached to the phenol rings containing from 6 to 12 carbon atoms per group, said resin adducted with 1 to 3 weights of oxyethylene per weight of resin.

10. The fluid of claim 9 wherein said resin is the product of the reaction of nonylphenol still bottoms with formaldehyde.

11. The fluid of claim 10 wherein is added 1 to 10 pounds per barrel of a water-soluble polyacrylate fluid loss reducing agent.

12. A fluid useful in drilling and completing wells which comprises, in combination, a mixture in water of clay solids, 5 pounds per barrel of a "clay flocculating surfactant" maintaining the clay solids in a flocculated state to provide a "flocculated clay solids system," 10 volume percent of mineral oil, 3½ pounds per barrel of sodium chloride, and 5 pounds per barrel of an emulsifier comprising an oxyethylene adduct of a polymethylene type resin, said resin the product of nonylphenol still bottoms reacted with formaldehyde, said resin adducted with 2 weights of oxyethylene for each weight of resin.

13. A fluid useful in drilling and completing wells which comprises, in combination, a mixture in water of clay solids, 5 pounds per barrel of a "clay flocculating surfactant" maintaining the clay solids in a flocculated state to provide a "flocculated clay solids system," 10 volume percent of mineral oil, 5 pounds per barrel of calcium sulfate, and 5 pounds per barrel of an emulsifier comprising an oxyethylene adduct of a polymethylene type resin, said resin the product of nonylphenol still bottoms reacted with formaldehyde, said resin adducted with 2 weights of oxyethylene for each weight of resin.

14. The fluid of claim 13 wherein is added 3 pounds per barrel of a water-soluble polyacrylate fluid loss reducing agent.

15. In a process for drilling a well wherein a drilling mud containing a clay maintained in flocculated state by a "clay flocculating surfactant" is circulated through the well and fluid is lost from the drilling mud into earthen formations surrounding the well, that improvement which comprises the steps of dispersing in the drilling mud from 1 to 20 volume percent of mineral oil and from 0.2 to 10 pounds per barrel of a compound having the structural formula

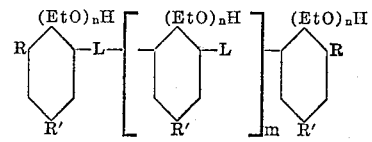

wherein L is selected from the group consisting of methylene, methylene substituted with not more than two alkyl groups containing a total of not more than 4 carbon atoms, and monosulfur (—S—) groups, R is selected from the group consisting of straight and branched chain alkyl groups having from 6 to 12 carbon atoms per group, R' is selected from the group consisting of straight and branched chain alkyl groups having from 6 to 12 carbon atoms per group, $n$ is an integer in the range from 6 to 25, inclusive, $m$ is an integer from 0 to 4, inclusive, and EtO is an ethylene oxide group; and circulating the drilling mud through the well in contact with said earthen formations.

16. The process of claim 15 wherein the compound dispersed in the drilling mud is bis (2-dinonylphenol) sulfide adducted with 12 to 50 mols of oxyethylene.

17. The process of claim 15 wherein there is also added from 1 to 10 pounds per barrel of a water-soluble polyacrylate fluid-loss reducer.

18. The process of claim 15 wherein the compound dispersed in the drilling mud is 2,2'-methylene bis (4,6-dinonylphenol) adducted with 12 to 50 mols of oxyethylene and wherein the fluid is heated to an elevated temperature to further improve its fluid-loss properties.

19. The process of claim 18 wherein the amount of adducted oxyethylene is about 30 mols.

20. In a process for drilling a well wherein a drilling mud containing a clay maintained in flocculated state by a "clay flocculating surfactant" is circulated through the well and fluid is lost from the drilling mud into earthen formations surrounding the well, that improved process for reducing fluid loss from the mud which comprises dispersing in the fluid from 1 to 20 volume percent of mineral oil and from 0.2 to 10 pounds per barrel of an oxyethylene adduct of a polyethylene resin, said resin being the product of the reaction of alkyl phenol still bottoms with a bridging compound selected from the group consisting of aliphatic aldehydes and ketones having not more than 4 carbon atoms per molecule and sulfur monochloride, the number of phenol rings in a molecule of said resin averaging from 2 to 6 and the alkyl groups attached to the phenol rings containing from 6 to 12 carbon atoms per group, said resin being adducted with from 1 to 3 parts of oxyethylene for each weight of resin; and circulating the resulting drilling mud through the well in contact with said earthen formations.

21. The process of claim 20 wherein the amount of oxyethylene adducted is about 2 parts by weight.

22. The process of claim 21 wherein there also is added from 1 to 10 pounds per barrel of a water-soluble polyacrylate fluid-loss reducing agent.

23. In a process for drilling a well wherein a drilling mud containing a clay maintained in flocculated state by a "clay flocculating surfactant" is circulated through the well and fluid is lost from the drilling mud into earthen formations surrounding the well, that improved process for reducing fluid loss from the mud which comprises dispersing in the drilling mud from 1 to 20 volume percent of mineral oil, and from 0.2 to 10 pounds per barrel of an oxyethylene adduct of a resin, said resin being the product of a reaction of nonylphenol still bottoms with formaldehyde, said product being adducted with from 1 to 3 parts by weight of oxyethylene for each part by weight of product; and circulating the resulting drilling mud through a well in contact with said earthen formations.

References Cited in the file of this patent

UNITED STATES PATENTS

| | | |
|---|---|---|
| 2,504,064 | Bock et al. | Apr. 11, 1950 |
| 2,873,251 | Jones | Feb. 10, 1959 |

FOREIGN PATENTS

| | | |
|---|---|---|
| 803,544 | Great Britain | Oct. 29, 1958 |

OTHER REFERENCES

Burdyn et al.: That New Drilling Fluid for Hot Holes, article in the Oil and Gas Journal, September 10, 1956, pages 104 to 107.